United States Patent Office 3,646,072
Patented Feb. 29, 1972

3,646,072
TURQUOISE BISCATIONIC ANTHRAQUINONE DYES
Daniel Shaw James, Hockessin, Del., assignor to E. I. du Pont de Nemours and Company, Wilmington, Del.
No Drawing. Filed July 27, 1970, Ser. No. 58,708
Int. Cl. C09b 1/50
U.S. Cl. 260—380
2 Claims

ABSTRACT OF THE DISCLOSURE

Acid modified bulk continuous filament nylon fibers can be dyed in turquoise shades with biscationic anthraquinone dyes prepared by quaternizing the biscondensation product of an N,N-disubstituted $C_{2-4}$ alkylenediamine and 1,4,5,8-tetrahydroxyanthraquinone. The biscationic dyes have excellent reserve on unmodified nylon fibers and fibers so dyed have sufficient light fastness for use in nylon styling carpeting.

BACKGROUND OF THE INVENTION

Multicolored bulked continuous filament BCF nylon styling carpeting has grown rapidly in popularity since its introduction a few years ago. Such carpeting initially contained several polyamide modifications which differ from each other with respect to the concentration of free amine end groups in the fiber. U.S. 3,078,248 describes the preparation of polyamide fibers of varying amine end content. Since amine groups act as dye sites for acid dyes, these modified nylons increase in acid dye receptivity as amine end content increases. Hence, when a carpet composed of three such nylons having low, medium and high amine end content (which may be termed light-, medium- and deep-dyeable nylon, respectively) is dyed with a suitable acid dye or dyes, a three-tone effect is produced. Greater versatility of shade is obtained by using disperse dyes in addition to acid dyes. Disperse dyes are not site-dyeing (since they possess no ionic groups) and thus dye all nylon modifications of the kind described above to the same depth, irrespective of the amine-end concentration. To illustrate this point, one can visualize a tricomponent nylon carpet dyed first with a suitable red acid dye and then with a yellow disperse dye. The red dye will produce light, medium and deep red shades, respectively, on the three different kinds of nylon. The yellow disperse dye, however, will dye all three nylons to the same depth of shade. The resulting shades will be reddish yellow, orange and scarlet, respectively.

With the introduction of "acid-modified" nylons (e.g. as in U.S. 3,184,436), the range of multicolored effects obtainable on BCF nylon styling carpeting was greatly increased. Acid-modified nylons, which contain sulfonic acid groups on the polymer chain, are dyeable with cationic dyes but have little or no affinity for acid dyes. Thus, a carpet containing two or three nylons of varying affinity for acid dyes and an acid-modified nylon which reserves (i.e. is not stained by) acid dyes can be dyed at will with any combination of shades, including primary colors (those colors that cannot be obtained by combining other colors) side by side on the same carpet. Dyeing methods have been developed so that such carpets can be dyed with acid and cationic dyes in a single dyeing operation. Thus, a red acid dye and a blue cationic dye (with a suitable dyebath additive to prevent coprecipitation of the dyes) will produce varying shades of red on the acid dye-receptive nylons and a blue shade on the acid-modified cationic dye-receptive nylon.

The choice of cationic dyes for acid-modified nylon in styling carpeting depends on two main considerations, namely, an adequate degree of fastness (particularly to light) on the acid-modified nylon and a lack of cross-staining on the unmodified nylons. The former consideration is self-explanatory, since the fastness requirements for carpet dyes are higher than for almost any other dye end-use; the latter consideration is important since cross-stains can have poor fastness properties and would tend to dull the shade of the acid dyes on the unmodified nylon components and minimize the color contrast between the different types of fiber.

It has been found that the staining of unmodified nylon with cationic dyes depends on the pH at which the dyes are applied to the substrate. Many commercial, monocationic dyes have satisfactory non-staining characteristics on unmodified nylon at low pH (i.e. 4 or below). However, at the preferred dyeing pH range for monocationic dyes of 6–6.5, staining becomes more apparent and tends to become unacceptable for commercial use.

SUMMARY OF THE INVENTION

Blue to turquoise dyes of the structure

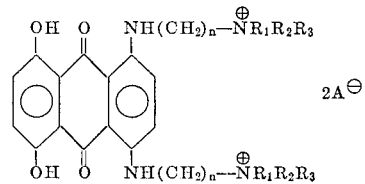

where $n = 2-4$
$R_1$ and $R_2 = C_{1-4}$ alkyl or together form a morpholino, pyrrolidino or piperidino ring
$R_3 = C_{1-4}$ alkyl or benzyl
or $R_1$, $R_2$ and $R_3$ together form a pyridinium ring with the nitrogen atom
$A^\ominus =$ anion useful in dyeing nylon styling yarns containing acid-modified nylon and unmodified nylon fibers in an aqueous dyebath at a pH of from about 6 to about 6.5 can be prepared by biscondensation of an N,N-disubstituted $C_2$-$C_4$ alkylenediamine and 1,4,5,5-tetrahydroxyanthroquinone. The dyes are novel turquoise dyes having excellent reserve of non-acid-modified nylon, deep dyeing characteristics on acid-modified nylon and excellent exhaust from the dyebath.

DESCRIPTION OF THE INVENTION

Acid-modified nylon styling yarns can be dyed under neutral to weakly acidic conditions with the biscationic anthraquinone dyes of this invention which dye the acid-modified nylon component in deep blue to turquoise shades and the non-acid-modified nylon fiber component is essentially unstained. This invention provides novel turquoise biscationic dyes, which are uniquely suited for application to nylon styling yarns, that have a high degree of light fastness on acid-modified nylon and practically no affinity for unmodified nylon under neutral to weakly acidic conditions.

The dyes which may be applied to acid-modified bulk continuous filament nylon according to this invention have the general formula

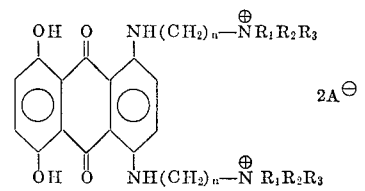

where $R_1$ and $R_2 = C_{1-4}$ alkyl, or together form a morpholino, piperidino, or pyrrolidino ring $R_3 =$ H, $C_{1-4}$ alkyl or benzyl or $R_1$, $R_2$ and $R_3$ together form a pyridinium ring with the N atom $n = 2-4$ $A^{\ominus} =$ anion The preferred dye specie is

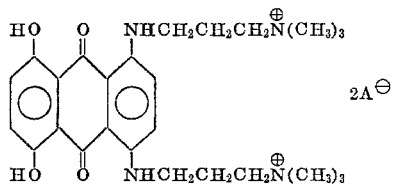

The dyes are prepared by heating leuco-1,4,5,8-tetrahydroxyanthraquinone with at least two moles of an amine of formula $R_1R_2N(CH_2)_nNH_2$, (where $R_1$, $R_2$ and $n$ have the meaning stated above) in an organic medium, which may be a solvent such as ethanol, isopropanol or Cellosolve, or an excess of the amine itself. It is advantageous to run the reaction under nitrogen to avoid oxidation of the leuco form before bis-condensation has occurred.

When the reaction is complete, the leuco form of the 1,4-diamino intermediate is oxidized either by heating in air with nitrobenzene or by passing air through the reaction mixture, and the two pendant tertiary amine groups are then treated with an acid or a quaternizing agent $R_3A$, giving the desired blue or turquoise biscationic dye.

Examples of amines that may be used to prepare dyes of this invention include the following:

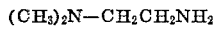 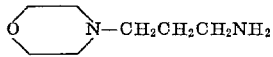
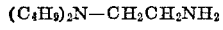 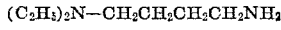
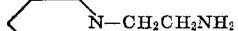 
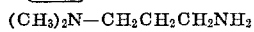 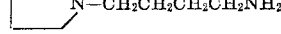

$R_3A$ may represent any quaternizing agent known in the art. Although physical properties such as solubility and crystalline form would be affected by a change in $A^-$, dye application and fastness properties are substantially unchanged. Examples of typical quaternizing agents include dimethyl sulfate; diethyl sulfate; alkyl chloride, bromide or iodide (where alkyl=methyl, ethyl, n-propyl or n-butyl); benzyl chloride, bromide or sulfate; methyl, ethyl or benzyl p-toluenesulfonate. $R_3A$ may also be a strong acid such as hydrochloric acid, sulfuric acid or an arylsulfonic acid.

Other dyes of utility on acid-modified nylon fibers may be prepared by condensation of leuco-1,4,5,8-tetrahydroxyanthraquinone with quarternary amines of the formula

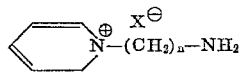

where $n = 2-4$ and $x^{\ominus} = Cl^{\ominus}$ or $Br^{\ominus}$, under conditions similar to those generally described above. Biscationic dyes are formed directly in this manner.

The dyes of this invention may also be isolated by salting a solution of the dye chloride with zinc chloride, or as the perchlorate or fluoroborate by salting a solution of the biscationic dye with the sodium salt of the corresponding inorganic acid.

The biscationic anthraquinone dyes of this invention have been found to have good exhaust and lightfastness on acid-modified BCF nylon fibers. Such polymers are described, for instance, in U.S. 3,184,436 and contain sulfonate groups along the polymer chain which act as dye sites for basic or cationic dyes. The instant dyes have also been found to display an almost total lack of affinity for unmodified nylon fibers under neutral to weakly acidic conditions. In other words, at pH 6–6.5, the biscationic dyes almost completely reserve nylon fibers which do not contain sulfonate groups. This behavior differs from that of known blue monocationic anthraquinone dyes, which tend to stain unmodified nylon under near-neutral conditions and which display good reserve only under more acidic conditions (i.e. pH 4 or below).

The importance of these observations lies in the fact that nylon styling carpeting, which contains acid-modified and unmodified nylons, is piece-dyed most satisfactorily at pH 6–6.5. Acid and cationic dyes are applied to the carpeting from a single dyebath, which contains an additive to prevent co-precipitation of the oppositely charged dye molecules. Several reasons why neutral to weakly acidic conditions are preferred for this dyeing procedure are as follows:

(a) Although cationic dyes generally reserve unmodified nylons more efficiently at lower pH, they do not exhaust as well from the dyebath onto acid-modified nylon;

(b) Acid dyes generally exhaust more efficiently at lower pH, but suffer a decrease in levelness on unmodified nylon and tend to stain acid-modified nylon at lower pH; and (c) Styling carpet that has a jute backing undergoes increased staining of the nylon by impurities in the jute with increasing acidity, causing dulling of dye shade and deterioration of dye fastness properties.

At neutral to weakly acidic conditions, cationic dyes may be applied to nylon styling carpet in conjunction with neutral-dyeing acid dyes, which have satisfactory exhaust and levelness under these conditions. It has now been discovered that the biscationic dyes described herein above have significantly better non-staining properties on unmodified nylon at pH 6–6.5 than any known commercial blue cationic dye.

Although biscationic dyes have been disclosed in the patent literature for several years for use on various substrates, particularly for acid-modified acrylic fibers, biscationic anthraquinone dyes like those disclosed in the present invention were found to have very limited utility on acrylics (such as those disclosed in U.S. 2,837,500 and U.S. 2,837,501) because of low affinity and poor buildup on the substrates. Much the same thing was found to be true of acid-modified polyester (such as is disclosed in U.S. 3,018,272). Thus, it was totally unexpected to find that the biscationic dyes of this invention have entirely adequate buildup on acid-modified nylon, producing deep blue to turquoise shades thereon.

The novel biscationic dyes derived from 1,4,5,8-tetrahydroxyanthraquinone differ from those derived from 1,4-dihydroxyanthraquinone in two important respects: (a) they are more green in shade, and (b) they have a green flare which means they appear more green when viewed in artificial (incandescent) light than when viewed in natural (day) light. This property, which is a function of the extent to which a dye molecule absorbs visible light of varying wave length, has great commercial significance. Ideally, a dyed article would appear the same shade, regardless of the light under which it was viewed. Thus, a customer who bought a carpet which appeared to be just the right shade when viewed under the store lights would never be chagrined next day to see a very different shade of carpet in daylight. The extent and direction of flare of a mixed shade is, of course, dependent on the flare characteristics of the component dyes.

Commercial nylon styling carpet usually contains acid-modified nylon and from two to four unmodified nylons of varying acid dye receptivity which are tufted onto a backing in a random pattern to give the desired styling effects.

In order to evaluate cationic and acid dyes for this end-use, however, a test carpeting is used in which the various nylons are tufted onto a backing in discreet bands. The instant dyes were evaluated on a test carpet with the following specifications: Five bands of trilobal, jet-bulked BCF nylon yarns, spun from the nylon flake, are tufted onto a non-woven polypropylene backing, each band being six tufts in width. The first band is acid-modified, 1300 denier BCF nylon (such as that described in U.S. 3,184,-436). The other four bands are unmodified, 3700 denier BCF nylons which have progressively increasing acid dye receptivity by virtue of an increasing amine-end content, which ranges from 5 to more than 100 gram-equivalents of free amine ends per $10^6$ grams of polymer. The specific amine-end range for each band is as follows:

(1) 5–25 gram-equivalents—"light-dyeable" with acid dyes
(2) 25–55 gram-equivalents—"medium-dyeable" with acid dyes
(3) 55–100 gram-equivalents—"deep-dyeable" with acid dyes
(4) 100–120 gram-equivalents—"ultradeep-dyeable" with acid dyes The deep-dyeing nylons (3) and (4) are disclosed in U.S. 3,078,248.

The carpeting is dyed by the procedure used for commercial styling carpet, which can be dyed with acid and cationic dyes in the same dyebath by using as a dyeing assistant a sulfobetaine of the general structure

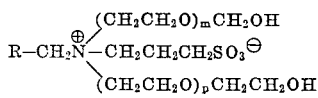

where

R=aliphatic hydrocarbon radical of 7–17 carbon atoms
$m=0-3$
$p=0-3$
$m+p<4$

The preparation of these compounds is described in U.S. 3,280,179. Their utility in this particular end-use is disclosed in the defensive publication of Robbins, S.N. 634,477 dated Apr. 29, 1969. The functions of the sulfobetaine additive are to prevent coprecipitation of the acid and cationic dyes, to enhance the levelness of both classes of dye without suppressing buildup and to minimize cross-staining.

Piece dyeing is carried out at temperatures above 70° C. and preferably near the boil (95–100° C.). Lower temperatures cause inferior exhaust and poor contrast through cross-staining. The pH of the dyebath may be anywhere from 3 to 9, but the most favored pH range is 6–6.5 as discussed above.

The sulfobetaine dyeing assistant may be used in amounts as low as 0.05% of the weight of the fiber being dyed, but the best results are obtained with 0.2–0.3%. Amounts in excess of 0.5% of the weight of the fiber have led to an increase in cross-staining.

The dyeing procedure is advantageously preceded by a bleach scour, as described in Example 7(a) below, in order to obtain maximum shade brightness and contrast.

Finally, dyeing is usually followed by conventional rinse and drying steps. Conventional finishing, drying, latexing, and double backing application may be performed by customary means.

The aforementioned dyeing procedure may be adapted for the continuous dyeing of styling carpet, a comparatively new technique which is referred to in "Melliand Textilberichte," 48, 415–448 (April 1967). Continuous dyeing is taught as being related to piece dyeing in that it is an aqueous process, but (a) at very low bath ratios, i.e., 5:1 instead of 30:1 to 50:1, and (b) the rate of fixation is much faster, since temperatures near the boil are attained more quickly in a steamer than in heating up a beck. Cationic and acid or direct dyes may also be printed onto nylon styling carpeting, with excellent results.

Although the discussion has been devoted up to this point to styling carpeting, there are other areas in which BCF nylon styling yarns may be effectively used, such as upholstery and accent or throw rugs. The dyed acid-modified nylon of this invention would be applicable to these end-uses as well as for carpeting. The dyeing of these items may be carried out by the same means as that described for carpeting, using suitable equipment. Thus, carpeting is usually dyed in becks; upholstery is usually dyed in jigs; accent or throw rugs are usually dyed in paddle machines.

Evaluation of the instant dyes was carried out by dyeing them singly onto nylon test carpeting as described above, in the absence of any acid dyes. In this way, the degree of cross-staining on the unmodified nylons is readily apparent. Staining occurs most readily on the unmodified band containing the least number of free amine ends, since this nylon contains the highest density of carboxylic acid end groups, which can act as dye sites for cationic dyes. Staining by cationic dyes can be induced on the "deep-dyeable" and "ultradeeper-dyeable" nylons by raising the dyeing pH, or by suitable choice of dye. However, the staining of the "light-dyeable" and "medium-dyeable" bands would then be so bad as to be quite unacceptable. A reasonable candidate will barely stain the first two bands and will leave the higher amine-end nylons untouched.

The prepartion of the dyes of this invention may be illustrated by the following examples. Parts are given by weight.

Example 1.—Condensation of N,N-dimethyl-1,3-propanediamine with leuco-1,4,5,8-tetrahydroxyanthraquinone To a stirred mixture of 276 parts of leuco-1,4,5,8-tetrahydroxyanthraquinone in 2200 parts of isopropanol under a nitrogen blanket was slowly added 225 parts of N,N-dimethyl-1,3-propanediamine. The mixture was heated to reflux and stirred at this temperature for 2½ hours. After cooling to room temperature, the mixture was clarified by filtration through filter cel and the residue washed with isopropanol. The washings were added to the filtrate. Nitrobenzene (61 parts) was added to the clarified solution, which was then heated to reflux for 1 hour and cooled to room temperature. Quaternization of the basic dye thus produced was effected by adding 536 parts of dimethyl sulfate slowly to the reaction mixture. The temperature rose to 65° C. After stirring overnight and allowing to cool to room temperature, the precipitated solid was separated by filtration and washed with isopropanol until the wash was only slightly colored. The filter cake was slurried at room temperature in 5000 parts of isopropanol, isolated by filtration, reslurried in hot (80° C.) isopropanol overnight, isolated again by filtration and washed with isopropanol until the wash was almost colorless. The solids were dried. Yield: 409 parts (59%); $\lambda_{max.}$ (in water) 611 and 644 m$\mu$; $\epsilon_{max.}$ 19,720, 20,000 liters per mole per cm., respectively. Found (percent): C, 49.15; H, 6.75; N, 7.3; S, 9.75. Calc. for $C_{28}H_{44}N_4O_{12}S_2$ (percent): C, 48.6; H, 6.3; N, 8.1; S, 9.2.

The product has the structure

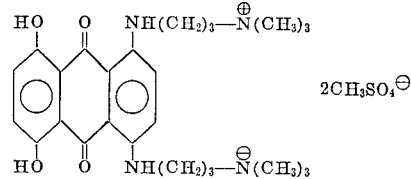

When applied to acid-modified nylon by the method illustrated in Example 5, a greenish-blue shade of good fastness to light is obtained.

Example 2

When 225 parts of N,N-dimethyl-1,3-propanediamine were replaced by (a) 282 parts of N-(2-aminoethyl) piperidine or (b) 380 parts of N,N-dipropyl-1,4-butanediamine in the procedure described in Example 1, a dye was obtained having the structure (a)

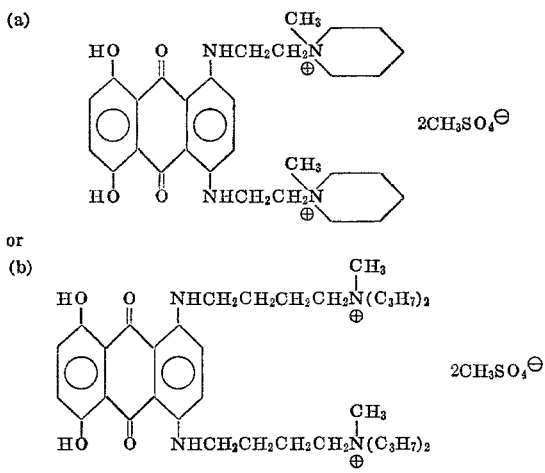

or (b)

respectively. The dyes give turquoise shades of good fastness to light when applied to acid-modified nylon by the procedure of Example 5.

Example 3

276 parts of leuco-1,4,5,8-tetrahydroxyanthraquinone and 225 parts of 3-dimethylaminopropylamine were heated at 85–90° C. in 2000 parts of Cellosolve under nitrogen blanket for 8 hours. The reaction mixture was cooled and 60 parts of nitrobenzene were added. The reaction mass was heated in air to 85–90° C. for 1 hour and then allowed to cool to room temperature by stirring overnight. The mixture was clarified by filtration through a bed of filter cel and the residue washed with a small quantity of Cellosolve. The washings were added to the filtrate. 260 parts of benzyl chloride were then added and the reaction mixture was stirred at 70–75° C. overnight. After cooling to room temperature, 8000 parts of water and 250 parts of sodium fluoborate were then added and the resulting suspension heated to 45–50° C. On cooling slowly to room temperature with stirring, considerable precipitation of a grainy solid occurred, which was subsequently isolated by filtration and washed with water and isopropanol. The solids were reslurried for 1 hour in 5000 parts of isopropanol and then separated by filtration and washed with isopropanol until the bleed was colorless. Finally, the product was washed with water (8000 parts) and then with isopropanol (2000 parts) and dried. Dry weight: 640 parts (80%). The chromatographically pure blue powder had $\lambda_{max.}$, 620, 673 m$\mu$; $\epsilon_{max.}$=20,400, 27,700 liter/mole/cm., respectively (in dimethylacetamide-water).

The structure of the dye is

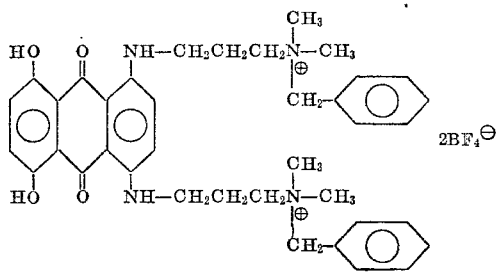

Shade and fastness on acid-modified nylon were similar to those of the dye of Example 1.

Example 4

When 225 parts of N,N-dimethyl-1,3-propanediamine in Example 1 were replaced by 312 parts of N-(3-aminopropyl)morpholine and the basic dye thus produced was quaternized with 290 parts of methyl iodide instead of methyl sulfate, a dye was formed that has the formula

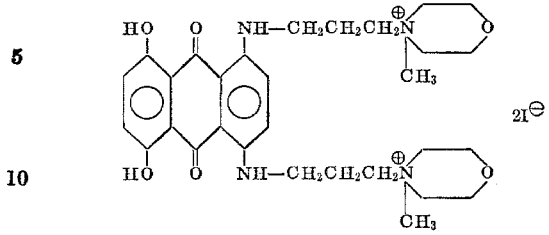

The chromatographically pure product has comparable shade and fastness on acid-modified nylon to the dye of Example 1.

The following examples illustrate the dyeing methods for banded test carpet prepared as described on page 8 above. In order to demonstrate the reserve of the bis-cationic dyes on unmodified nylon, they were dyed in the absence of acid dyes.

Example 5.—Dyeing of banded BCF nylon carpeting (a) Bleach scour.—100 parts of the carpeting described above were heated for 5 minutes at 80° F. in 4000 parts of water containing

| | Parts |
|---|---|
| Sodium perborate | 4 |
| Trisodium phosphate | 0.25 |
| A sulfobetaine [1] | 0.5 |

[1]

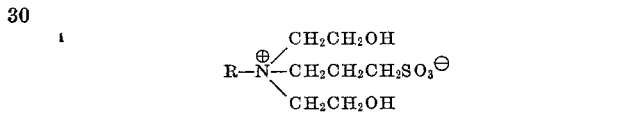

where R = $C_{18}$ alkyl (~30%), $C_{18}$ alkyl (~30%), $C_{18}$ mono-unsaturated (~40%).

The temperature was raised to 160° F. for 15 minutes and the carpet rinsed in water at 100° F.

(b) Dyeing procedure.—The carpeting was added to 4000 parts of water containing

| | Part |
|---|---|
| The aforementioned sulfobetaine | 1 |
| The tetrasodium salt of ethylenediamine tetraacetic acid | 0.25 |
| Tetrasodium pyrophosphate | 0.2 |

The dyebath was adjusted to pH 6 with monosodium phosphate and the temperature raised to 80° F. for 10 minutes. 0..05 part of the dye of Example 1 was added and, after holding the dyebath at 80° F. for 10 minutes, the temperature was raised at ca. 2° F. per minute to 210° F. and held at this temperature for 1 hour. The carpeting was rinsed in cold water and dried. The acid-modified band was dyed a turquoise shade.

The dyeing procedure was repeated on another of banded nylon carpeting with a commercially available dye of the structure

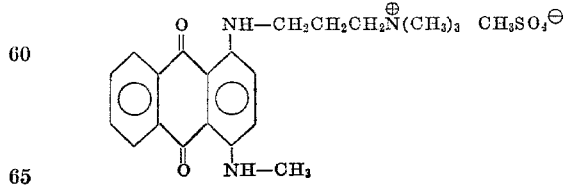

The acid-modified band was dyed a blue shade. The amount of the dye was adjusted to give a shade of comparable depth to that obtained with the dye of Example 1.

Example 6.—Continuous dyeing of nylon styling carpeting

Using Kusters Equipment as described in "Textile Chemist and Colorist" Jan. 14, 1970, pp. 6–12, nylon styling carpeting containing acid-modified, medium-dyeable and ultra-deep-dyeable nylons tufted in a random pattern on a non-woven polypropylene backing was run through a wet-out bath at 80° F. containing

| | G./l. |
|---|---|
| An organic alcohol extended with ethylene oxide | 1.5 |
| A sulfated polyglycol ether | 0.6 |

Pickup was about 80%. The carpeting was then continuously treated with an aqueous dyebath composition containing

| | |
|---|---|
| the dye of Example 1 | 5 |
| An organic alcohol extended with ethylene oxide | 0.25 |
| A sulfated polyglycol ether | 1.25 |
| A purified natural gum ether | 2 |
| The sulfobetaine described in Example 5 | 5 |
| Acetic acid | 3 |

Monosodium phosphate to adjust the pH to ca. 5.

The dyebath temperature was 80° F. Pickup was about 200%. The carpeting was then run through a steamer at 212° F., in which the dwell time was 8 minutes. The carpeting was rinsed thoroughly and dried. The acid-modified nylon fibers were dyed a deep turquoise shade; the unmodified fibers were negligibly stained.

Example 7.—Evaluation of cross-staining

The following evaluation of the banded carpet samples dyed as described in Example 5 above illustrates the superior nonstaining properties of the biscationic dyes vs. the monocationic dyes.

TABLE

| | Dye of Example 1 | Commercially available dye |
|---|---|---|
| "Light-dyeable" band | 5–4 | 3 |
| "Medium-dyeable" band | 5–4 | 4 |
| "Deep-dyeable" band | 5 | 5–4 |
| "Ultradeep-dyeable" band | 5 | 5–4 |

The numbers are Gray Scale stain ratings as given in the Manual of the American Association of Textile Chemists and Colorists and have the following significance:

5—negligible or no stain
4—slightly stained
3—noticeably stained
2—considerably stained
1—heavily stained The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Turquoise dye having the structure:

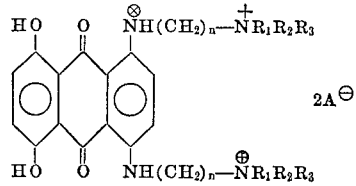

where $n = 2–4$ $R_1$ and $R_2 = C_{1-4}$ alkyl or together form a piperidine, morpholino or pyrrolidino group $R_3 = $ H, $C_{1-4}$ alkyl or benzyl or $R_1$, $R_2$ and $R_3$ together with the N atom form a pyridinium ring $A^\ominus = $ anion.

2. The turquoise dye of claim 1 in which $n = 3$, $R_1 = CH_3$, $R_2 = CH_3$ and $R_3 = CH_3$.

References Cited

FOREIGN PATENTS 624,035  7/1961  Canada _____ 260—380

LORRAINE A. WEINBERGER, Primary Examiner

R. GERTSL, Assistant Examiner

U.S. Cl. X.R.

8—39, 40; 260—247.5 R, 272, 326.5 C, 373

UNITED STATES PATENT OFFICE
CERTIFICATE OF CORRECTION

Patent No. 3,646,072  Dated February 29, 1972

Inventor(s) Daniel Shaw James

It is certified that error appears in the above-identified patent and that said Letters Patent are hereby corrected as shown below:

Column 3, line 64, the term "x $\ominus$" should be -- X $\ominus$ --. Column 6, line 21, the term "ultradeeper-dyeable" should be -- ultradeep-dyeable --. In Claim 1, line 14, the "$\otimes$" should be deleted and the "+" should be --$\oplus$--; in Claim 1, line 24, the word "piperidine" should be -- piperidino --.

Signed and sealed this 3rd day of October 1972.

(SEAL)
Attest:

EDWARD M. FLETCHER, JR.　　　　　　　　ROBERT GOTTSCHALK
Attesting Officer　　　　　　　　　　　　Commissioner of Patents